United States Patent
Taylor et al.

(10) Patent No.: US 8,379,837 B2
(45) Date of Patent: Feb. 19, 2013

(54) METHOD AND SYSTEM FOR PROVIDING AND MANAGING PUBLIC TELEPHONE DIRECTORY SERVICE

(75) Inventors: Kirk S. Taylor, San Diego, CA (US); Jack Steenstra, San Diego, CA (US); Liren Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2018 days.

(21) Appl. No.: 11/123,444

(22) Filed: May 6, 2005

(65) Prior Publication Data

US 2006/0251239 A1 Nov. 9, 2006

(51) Int. Cl.
*H04M 1/00* (2006.01)
(52) U.S. Cl. ......... 379/355.04; 379/355.03; 379/218.01; 726/15; 709/223; 719/310; 715/205
(58) Field of Classification Search ............. 379/355.04, 379/355.01–355.1
See application file for complete search history.

(56) References Cited

U.S. PATENT DOCUMENTS

| | | | | |
|---|---|---|---|---|
| 5,960,442 | A * | 9/1999 | Pickering | 379/218.01 |
| 6,539,077 | B1 * | 3/2003 | Ranalli et al. | 379/67.1 |
| 6,931,419 | B1 * | 8/2005 | Lindquist | 707/200 |
| 7,039,177 | B1 * | 5/2006 | Smith et al. | 379/355.03 |
| 7,441,270 | B1 * | 10/2008 | Edwards et al. | 726/15 |
| 2002/0071534 | A1 | 6/2002 | Tanaka et al. | |
| 2002/0143909 | A1 | 10/2002 | Botz et al. | |
| 2003/0039241 | A1 | 2/2003 | Park et al. | |
| 2003/0074461 | A1 | 4/2003 | Kang et al. | |
| 2004/0057419 | A1 | 3/2004 | Stanford | |
| 2006/0251239 | A1 | 11/2006 | Taylor et al. | |

FOREIGN PATENT DOCUMENTS

| | | |
|---|---|---|
| JP | 2002135312 | 5/2002 |
| JP | 2002300263 | 10/2002 |
| JP | 2003078617 | 3/2003 |
| JP | 2005051475 | 2/2005 |
| WO | 2006121863 A2 | 11/2006 |

OTHER PUBLICATIONS

Marshall, B., LDAP Servers and Applications [online], SAGE AU Conf 2004. [retrieved on Apr. 12, 2007] Retrieved from the Internet: <URL: http://quark.humburg.org.aulpublicationslldaplldap-apps-v2pdf, p. 9.20.
Supplementary European Search Report—EP06759159, Search Authority—Munich Patent Office, Jun. 8, 2010.
Faltstrom P: "E.164 number and DNS" [Online] Sep. 1, 2000, XP002192484 Retrieved from the internet : URL:http://www.faqs.org/rfcs/rfc2916.html.
International Search Report and Written Opinion—PCT/US2006/017416. International Search Authority—European Patent Office—Aug. 20, 2007.

* cited by examiner

*Primary Examiner* — Duc Nguyen
*Assistant Examiner* — Ibraham Sharifzada
(74) *Attorney, Agent, or Firm* — Nicholas A. Cole (57) ABSTRACT

An apparatus for use in a directory service is disclosed. The apparatus may include a memory configured to store a local directory and a processor configured to manage the local directory, the local directory including a plurality of directory entries organized in a subdomain hierarchical structure, each directory entry being associated with an alias constructed using subdomain hierarchical information, each alias being linked to a user domain associated with a user, the user domain being linked to a record containing contact information for the user.

50 Claims, 7 Drawing Sheets

METHOD AND SYSTEM FOR PROVIDING AND MANAGING PUBLIC TELEPHONE DIRECTORY SERVICE

BACKGROUND

1. Field

The present disclosure relates generally to public telephone directories, and more specifically, to methods and systems for providing and managing network-based public telephone directory service.

2. Background

When a caller needs to contact another individual by telephone, the caller is required to know that individual's telephone number. If the required telephone number is not available, then the call cannot be made. People utilize various means to maintain their personal telephone directories. Some people still use the traditional hardcopy personal directory to keep their telephone numbers. However, with the advanced capability and proliferation of electronic devices, more and more people are maintaining their personal telephone directories electronically on their own electronic devices, such as, mobile phones, personal digital assistants (PDAs) and computers.

Even though use of electronic devices to maintain personal telephone directories has become commonplace, such directories remain highly personal and localized. For example, a person might keep a personal directory on his/her mobile phone. Such directory is resident on a specific mobile phone and is not accessible to a user if that mobile phone is not physically available. Consequently, if a user forgets to bring his/her mobile phone, then there is no way for the user to retrieve information from the directory resident on that phone. Furthermore, a directory on the mobile phone is not easily accessible to other users. Even though some mobile phones or PDAs are equipped with short-range wireless applications to facilitate exchange of information, information exchanges are generally limited to ad hoc situations in which both devices are in relatively close proximity of one another.

Public electronic telephone directories are also available on the Internet. However, these directories tend to be compiled independently by different business entities. As a result, there is little synchronization between directories and changes made to telephone numbers do not always get propagated effectively to all directories. In addition, since these directories are compiled by different business entities, owners exercise little to no control over inquiry and distribution of their telephone numbers.

Hence, it would be desirable to provide methods and systems that are capable of providing network-based public telephone directory service that can be used to resolve, amongst other things, at least some of the foregoing problems.

SUMMARY

The techniques disclosed herein address the above stated needs by providing an apparatus for use in directory service comprising a memory configured to store a local directory; and means for managing the local directory; wherein the local directory including a plurality of directory entries organized in a subdomain hierarchical structure, each directory entry being associated with an alias constructed using subdomain hierarchical information, each alias being linked to a user domain associated with a user, the user domain being linked to a record containing contact information for the user. The apparatus may further comprise means for requesting contact information of a specified user, wherein the request includes an alias for the specified user; and means for receiving a response pursuant to the request, wherein the response includes the contact information of the specified user, and wherein the response is tailored based on the request and additional information associated with the specified user.

In another aspect, a method and processor for use in a directory service is disclosed to create a local directory; and to manage the local directory; wherein the local directory includes a plurality of directory entries organized in a subdomain hierarchical structure, each directory entry being associated with an alias constructed using subdomain hierarchical information, each alias being linked to a user domain associated with a user, the user domain being linked to a record containing contact information for the user. The method and processor may be further comprise to request contact information of a specified user, wherein the request includes an alias for the specified user; and receive a response pursuant to the request, wherein the response includes the contact information of the specified user, and wherein the response is tailored based on the request and additional information associated with the specified user.

In a further aspect, a server for use in directory service comprises a database configured to store a plurality of directories corresponding to a plurality of users, each directory including a plurality of directory entries organized in a subdomain hierarchical structure, each directory entry being associated with an alias constructed using subdomain hierarchical information, each alias being linked to a user domain associated with a corresponding user, the user domain being linked to a record containing contact information for the corresponding user; and a processor configured to manage the database.

In still another aspect, a method and processor for use in directory service are disclosed to store a plurality of directories belonging to a plurality of users, each directory including a plurality of directory entries organized in a subdomain hierarchical structure, each directory entry being associated with an alias constructed using subdomain hierarchical information, each alias being linked to a user domain associated with a corresponding user, the user domain being linked to a record containing contact information for the corresponding user; and to manage the database.

In the above server and processor, the processor may be configured to control one or a combination of optimizing organization of the plurality of directory entries amongst the plurality of directories using the subdomain hierarchical information; evaluating the plurality of directories entries amongst the plurality of directories using the subdomain hierarchical information and identifying a plurality of relationships amongst the users; and receiving a request seeking information on a degree-of-separation relationship between two users, evaluating the request and forwarding the information on the degree-of separation relationship between the two users.

In yet another aspect, a machine readable medium for use in a directory service is disclosed comprising a plurality of directory entries organized in a subdomain hierarchical structure; wherein each directory entry is associated with an alias constructed using subdomain hierarchical information; wherein each alias is linked to a user domain associated with a user; and wherein the user domain is linked to a record containing contact information for the user. In other aspects, the machine readable medium may comprise control logic executable by a processor, the control logic including a plurality of instructions, the plurality of instructions comprising: a set of instructions for managing the local directory; wherein the local directory including a plurality of directory entries organized in a subdomain hierarchical structure, each directory entry being associated with an alias constructed using subdomain hierarchical information, each alias being linked to a user domain associated with a user, the user domain being linked to a record containing contact information for the user.

In still a further aspect, a server for use in directory service is disclosed comprising: a memory configured to store a plurality of directory entries; and a processor configured to control: receiving a request for a specified user; looking up a corresponding directory entry for the specified user from the plurality of directory entries pursuant to the request, wherein at least one of the plurality of directory entries includes one or more phone numbers and additional information associated with that entry; and tailor a response based on the request and the additional information associated with the directory entry corresponding to the specified user.

In yet a further aspect, a method and processor for use in directory service are disclosed to store a plurality of directory entries belonging to a plurality of users, wherein at least one of the plurality of directory entries includes one or more phone numbers and additional information associated with that entry; to receive a request for information of a specified user; to look up the corresponding directory entry for the specified user from the database; and to tailor a response based on the request and the additional information associated with the directory entry corresponding to the specified user.

In the above server and processor, the processor may further be configured to control one or a combination of updating a directory entry in the database; maintaining a local directory and forwarding a copy of the local directory to the database for archival purposes; synchronizing the local directory with the copy of the local directory stored on the database; and receiving user input seeking contact information for a specified user, generating a request based on the input, wherein the request is to be used to look up a corresponding directory entry for the specified user from a plurality of directory entries, wherein at least one of the plurality of directory entries includes one or more phone numbers and additional information associated with that entry, and receiving a response pursuant to the request, wherein the response is tailored based on the request and the additional information associated with the directory entry corresponding to the specified user.

In addition, in the description above, the request may further include one or both of either information relating to a user making the request or information relating to a client. The additional information associated with the directory entry corresponding to the specified user may include an access policy of the specified user, the access policy being used to determine how to tailor the response. The processor may be further configured to tailor the response based on state information. The state information may include a network presence of the specified user. Moreover, the request may be received using Domain Name System (DNS) protocols.

It is understood that other embodiments of the present invention will become readily apparent to those skilled in the art from the following detailed description, wherein various embodiments of the invention are shown and described by way of illustration. As will be realized, the invention is capable of other and different embodiments or combination of embodiments, and its several details are capable of modification in various other respects. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention.

Figure 1:
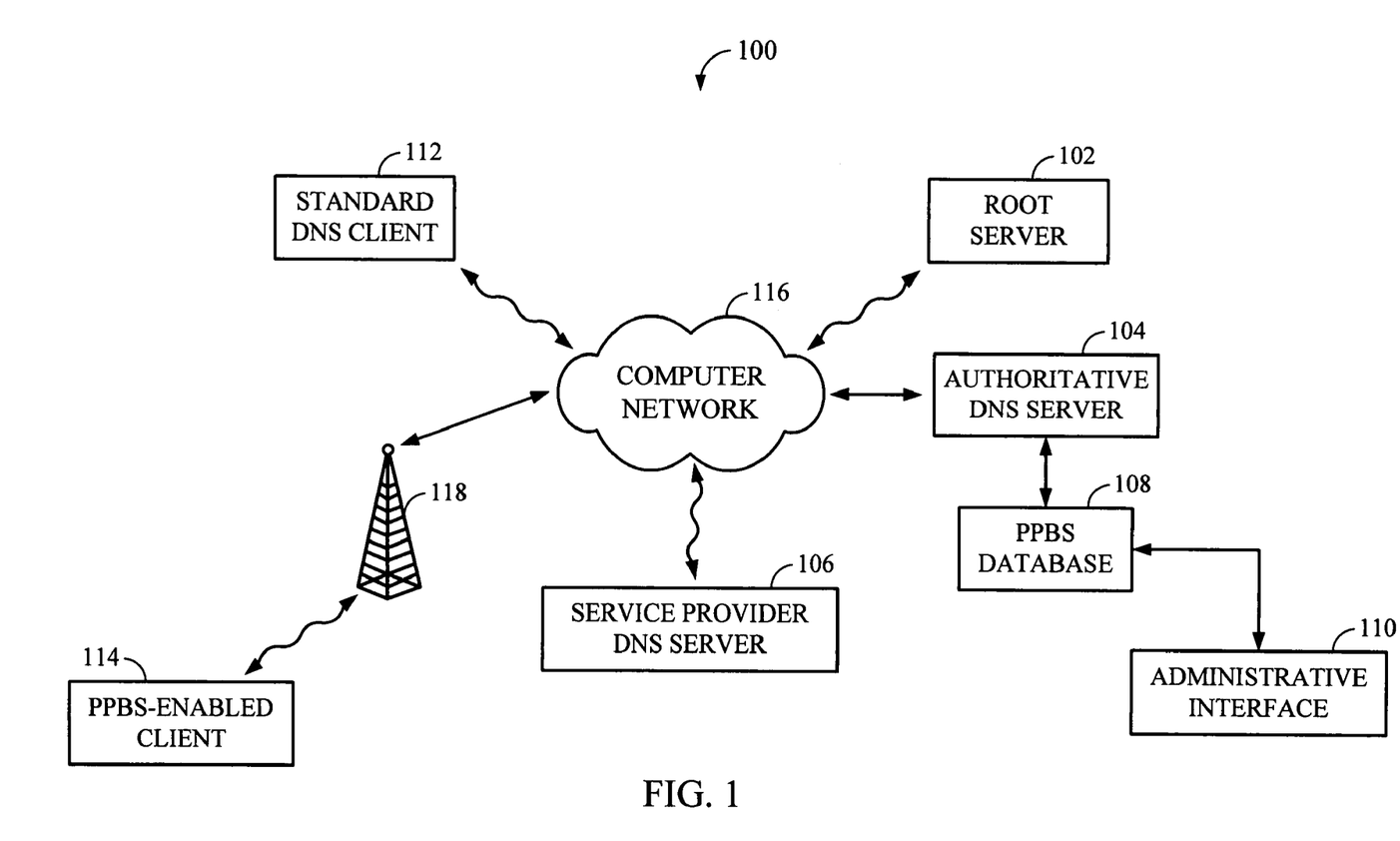
FIG. 1 is a simplified schematic diagram illustrating one embodiment of a network-based public phone book service.

FIG. 1 is one system configuration that can be used to implement a directory service. While various types of directory services can be used, a network-based public phone book service (PPBS) will be used as an example for purpose of explanation. In one embodiment, the system 100 may be implemented utilizing the Domain Name System (DNS) infrastructure. Protocols for the DNS are defined in RFCs (Requests for Comments) 1034 and 1035. The primary function of the DNS is to handle mapping between Internet domain or host names and their corresponding Internet Protocol (IP) addresses. Because maintaining a central list of domain name/IP address correspondences would be impractical, the lists of domain names and IP addresses are distributed throughout the Internet in a hierarchy of authority. It should be noted that while the system 100 may be implemented using the DNS infrastructure, a person of ordinary skill in the art would appreciate how to implement the system 100 using other types of protocols and architectures based on the disclosure and teachings provided herein.

The architecture of the DNS uses a client-server model. Briefly, the way DNS is used is as follows. To map a domain name onto an IP address, an application program calls a library procedure called the resolver. The domain name is passed as a parameter. The resolver sends a packet to a local DNS server. The local DNS server then looks up the name and returns the IP address to the resolver. The resolver, in turn, returns the IP address to the application program. With the IP address available, the application program can then establish a connection with the destination represented by the domain name.

The existing DNS infrastructure can be modified to implement the network-based PPBS. The system 100 may include a number of servers including a root server 102, an authoritative DNS server 104 and a service provider DNS server 106, a PPBS database 108 and an associated administrative interface 110, a standard DNS client 112, a PPBS-enabled client 114, a computer network 116 (such as the Internet), and a wireless network 118. While the root server 102, the service provider DNS server 106, the authoritative DNS server 104, the PPBS database and administrative interface 110 have been illustrated as separate elements, all or a combinations of the elements may be implemented together.

The standard DNS client 112 may include any devices that are capable of supporting DNS protocols. For example, the standard DNS client 112 may be able to issue standard DNS queries to request information from the PPBS database 108.

The PPBS-enabled client 114 may include mobile devices, such as, mobile phones, personal digital assistants (PDAs) and other types of mobile communications devices. The PPBS-enabled client 114 may be configured to support DNS protocols as well as PPBS applications. It should be noted that the PPBS-enabled client 114 need not be a mobile device; any device that can be configured to support DNS protocols and PPBS applications may be used.

Figure 2:
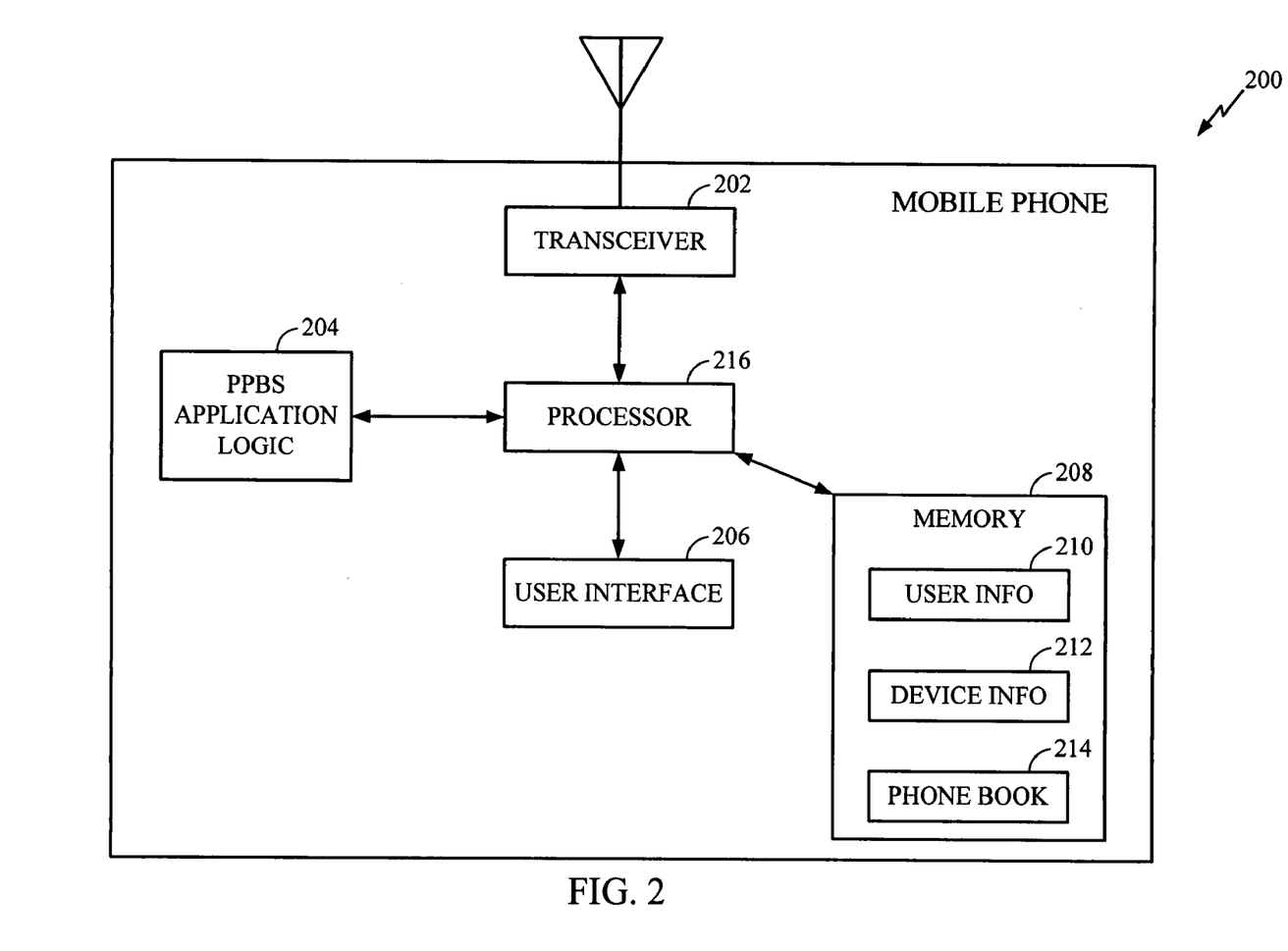
FIG. 2 is a simplified schematic diagram illustrating a mobile device that may be used as a public-phone-book-service-enabled client.

FIG. 2 illustrates an example mobile device such as a mobile phone 200 that can be used as the PPBS-enabled client 114. The mobile phone 200 may include a transceiver 202, PPBS application logic 204, a user interface 206, a memory 208 and a processor 216.

The transceiver 202 may be configured to transmit and receive signals to and from the mobile phone 200. The transceiver 202 may facilitate mobile phone communications with the wireless network 118. Control logic associated with the transceiver 202 may further provide various signals processing functions such as encoding and modulation. In the case of a CDMA (Code Division Multiple Access) phone, such control logic may also include spread spectrum processing.

The user interface 206 may include, for example, a screen, a key pad or other input/output devices which allow a user of the mobile phone 200 to view certain information and provide input to the mobile phone 200. For example, the user interface 206 can be used by a user to provide lookup information that is used to formulate a request for a phone book entry in the PPBS database 108.

The PPBS application logic 204 may include various types of control logic that are configured to support corresponding PPBS applications. Such applications may include, for example, entry creation, lookup, update, backup and downloading applications. For instance, one application may be used by the user to build a phone book based on the DNS subdomain concept and DNS aliases. This and other applications will be further described below. It should be noted that a phone book is one type of a directory.

Accordingly, directories other than a phone book, such as but not limited to an address book, a reference book or a contact list, can be implemented for providing directory service. However, since the directory service is described with reference to the PPBS, a phone book will be used as am example also for purpose of explanation.

The memory 208 may be used to store various types of information including, for example, user information 210, device information 212 and a local phone book 214. User information 210 may include relationship information between a user and owners of phone book entries in the PPBS database 108. The local phone book 214 may be used to store phone book entries created by the user as well as entries retrieved from the PPBS database 108.

The processor 216 may be configured to control operations of the mobile phone 200 by providing coordination amongst the various components mentioned above.

The service provider DNS server 106 may be configured to receive a request or query from the PPBS-enabled client 114 and provide a response to the request. The request may be for a particular phone book entry stored in the PPBS database 108. The service provider DNS server 106 may cooperate with the root server 102 and the authoritative DNS server 104 to effect retrieval of the appropriate information from the PPBS database 108. The service provider DNS server 106 may be a server operated by a telecommunication carrier that provides wireless communications services for the PPBS-enabled client 118.

The root server 102 may be a server that maintains directory information on the authoritative DNS server 104. The root server 102 may provide information to an inquirer allowing the inquirer to contact the authoritative DNS server 104.

The authoritative DNS server 104 may be an authority that maintains and manages information associated with a particular domain, such as, the phone book entries associated with PPBS that are stored in the PPBS database 108. Hence, any phone book entry obtained from the PPBS database 108 via the authoritative DNS server 104 is always accurate.

Figure 8:
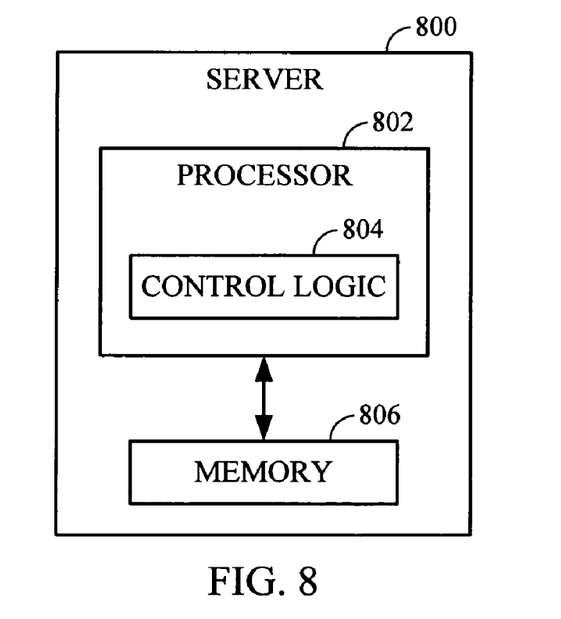
FIG. 8 is a simplified schematic diagram illustrating a server configuration for use under the network-based public phone book service.

It should be noted that the service provider DNS server 106, the root server 102 and the authoritative DNS server 104 may further include processors having control logic and memories that are configured to perform their respective functionality as described herein. FIG. 8 is a simplified schematic diagram illustrating one configuration of a server 800 that can be assumed by the service provider DNS server 106, the root server 102 and the authoritative DNS server 104. The server 800 may include a processor 802 having control logic 804 and a memory 806.

The PPBS database 108 may be configured to store phone book entries including telephonic and other associated information pertaining to corresponding PPBS users. The PPBS database 108 may also be configured to allow PPBS users to store their respective phone books. The information in the PPBS database 108 is organized based on the DNS subdomain concept and DNS aliases to allow users to organize and name entries in their phone books in ways that make the most sense to them. DNS aliases can also be referred to as CNAME resource records under DNS protocols. When organized using the applicable DNS protocols, each phone book entry can be constructed into a DNS name which can then be used in many DNS functions, such as, queries, updates, etc. The administrative interface 110 may be used by an administrator to maintain the phone book entries stored in the PPBS database 108. Details regarding the interconnections and interactions of the foregoing components will be further described below.

Figure 3:
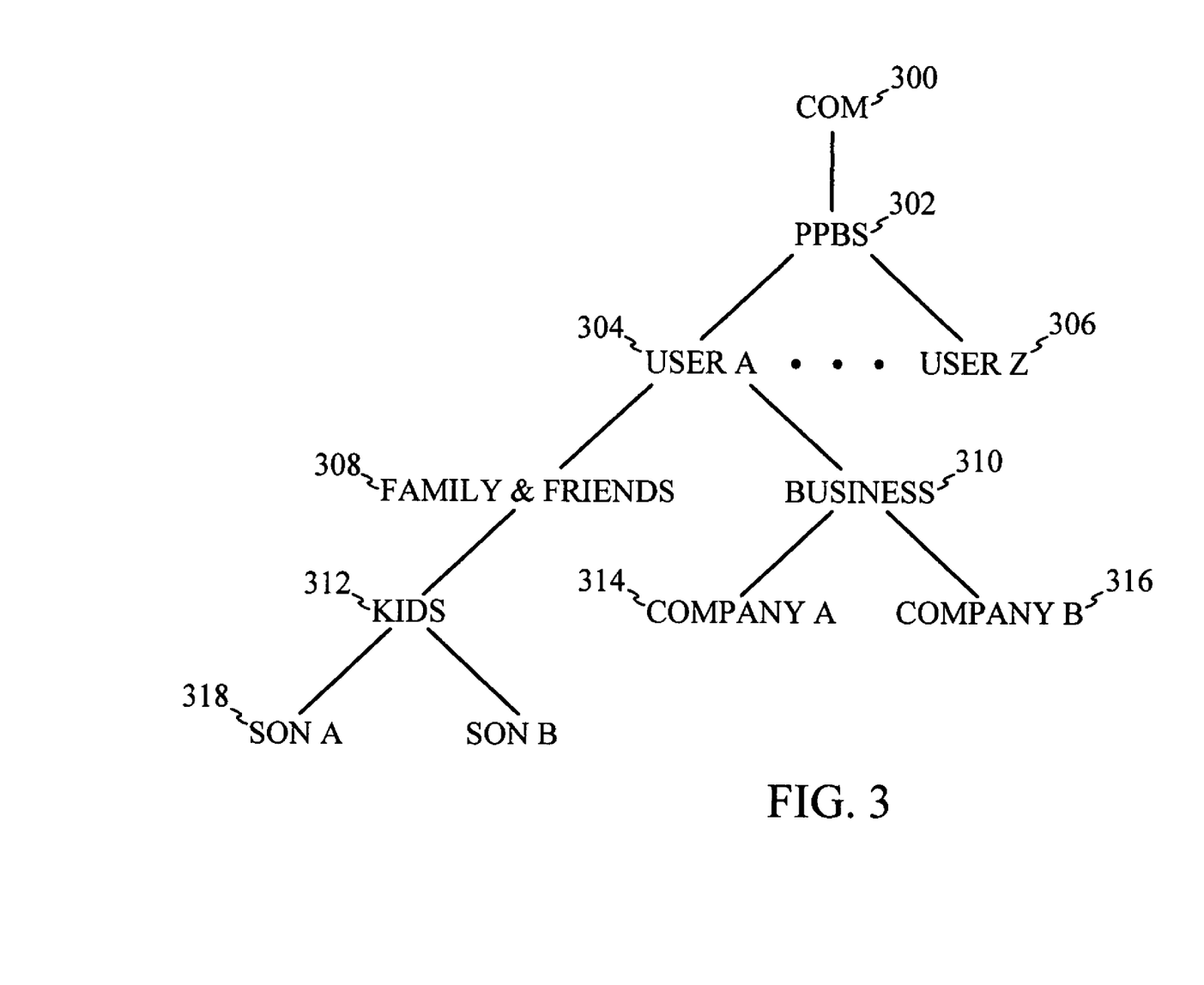
FIG. 3 is a simplified schematic diagram illustrating one example of the use of the DNS subdomain concept and aliases as applied to the network-based public phone book service.

FIG. 3 illustrates the DNS subdomain concept and DNS aliases as applied to the PPBS service. The "com" designation 300 refers to a top-level domain. The PPBS service is treated as a domain under the top-level "com" domain, such as, "ppbs" 302. Each PPBS user is assigned a corresponding subdomain under the "ppbs" domain. The assigned subdomain is used as the default domain for that user's phone book. For example, an assigned subdomain for user A can be "userA" 304. The DNS subdomain concept allows further subdomains to be created under a subdomain. Using subdomains in this way allows a user to create subdomains to organize his/her phone directory in a customized manner. For example, under the subdomain "userA" 304, user A can further create subdomains "family&friends" 308 and "business" 310 to respectively store phone numbers and contact information for user A's family and friends and business associates. Similarly, under each of the subdomains "family&friends" 308 and "business" 310, additional subdomains can be created. For instance, the subdomain "kids" 312 can be created under the subdomain "family&friends" 308.

As shown in FIG. 3, the subdomains can be named using DNS aliases. Users can associate user subdomains or records that they want in their phone books or directories with nicknames (i.e. DNS aliases) that they find meaningful. Each DNS alias references a real record and different aliases can be used to reference the same record. In this way, different users can create aliases named in a way that make sense to them. For example, one user may choose to associate a record with the alias "boss", while another user may choose to associate a record with the alias "dad", even though both aliases point to the same record, "johndoe.ppbs.com".

An entry in a phone book can be constructed into a regular DNS name in the following manner. A period "." is appended to the end of the alias or name corresponding to that entry. The subdomain name structure is then traversed in the reverse direction. The subdomain name(s) are then appended to the end of the alias. More specifically, each subdomain name is sequentially appended with a period "." added to the end. Using FIG. 3 as an example, the phone book entry "sonA" can be constructed into the DNS name "sonA.kids.family&friends.userA.ppbs.com". The constructed DNS name can now be used in DNS queries or other transactions under the DNS protocols.

Organized in the foregoing fashion using the DNS subdomain concept and DNS aliases, phone book entries may be made accessible to any DNS-enabled client, such as the standard DNS client 112, on the Internet. This is because, under the DNS protocols, DNS names can be used in DNS queries for a certain type of DNS resource record. Furthermore, the PPBS-enabled client 114 that has been enable to handle PPBS can also easily access DNS names across the Internet due to the well-established and ubiquitous access to the DNS infrastructure.

Figure 4:
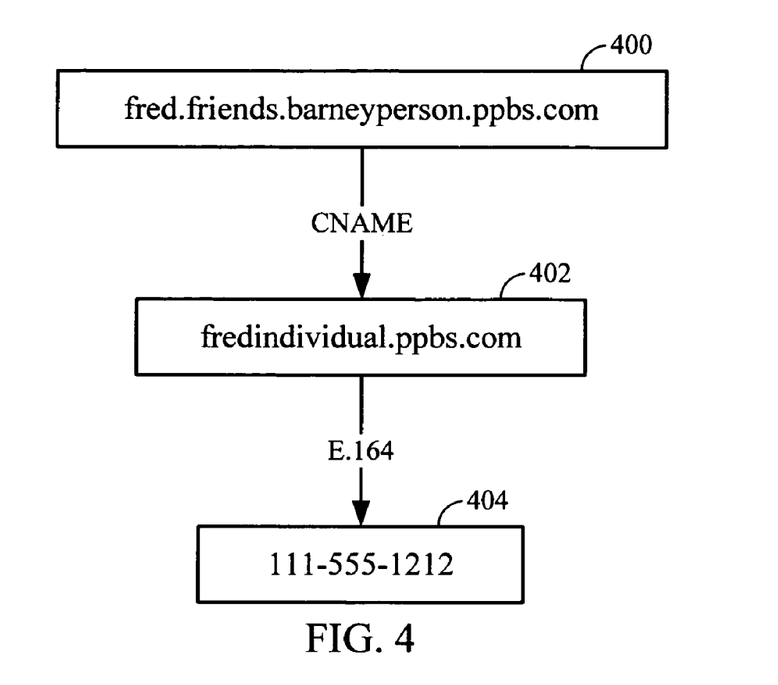
FIG. 4 is a simplified schematic diagram illustrating another example of the use of the DNS subdomain concept and aliases as applied to the network-based public phone book service.

The following is another example illustrating the use of DNS subdomains and aliases. The names "Fred Individual" and "Barney Person" are used in this example. Fred and Barney are both PPBS users. As PPBS users, they are both registered with PPBS and assigned subdomains in the PPBS system. More specifically, Fred and Barney are assigned subdomains (represented in DNS terms) "fredindividual.ppbs.com" and "barneyperson.ppbs.com" respectively. These subdomains are also their default domain names in the PPBS system. These default domain names also have respective phone numbers assigned to them. In DNS terms, these phone numbers are ISDN/E.164 DNS resource records. Barney creates a subdomain under his own subdomain using a DNS alias called "friends". Barney then further creates a DNS alias called "fred" under his "friends" subdomain. FIG. 4 illustrates how Barney's phone book entry with respect to Fred is associated with Fred's record. Barney's phone book entry for Fred (constructed as a DNS name) "fred.friends.barneyperson.ppbs.com" 400 is pointed to Fred's default domain "fredindividual.ppbs.com" 402 which, in turn, is linked to Fred's record 404 that contains Fred's phone number "111-555-1212". When Barney wishes to look up Fred's phone number, a query for "fred.friends.barneyperson.ppbs.com" can be constructed and passed to the PPBs system for lookup. If Fred ever changes his phone number, Barney will be able to retrieve the new phone number because it is referenced through Fred's default domain under the PPBS system.

Figure 5:
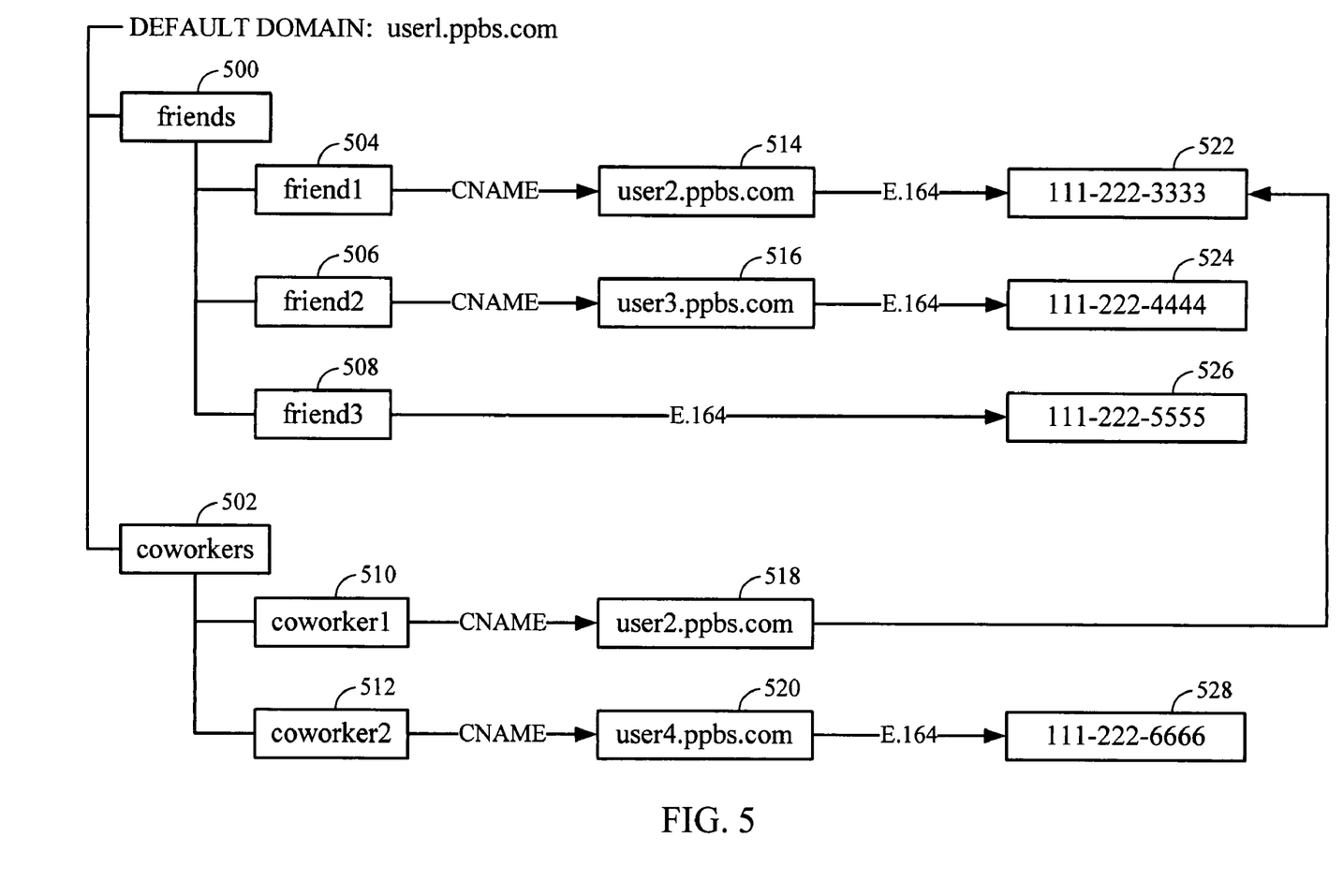
FIG. 5 is a simplified schematic diagram illustrating a user's phone book under the network-based public phone book service.

FIG. 5 further illustrates a user's (User1) phone book under the PPBS system 100. User1's phone book may be stored on the PPBS database 108. User1 has created two subdomains "friends" 500 and "coworkers" 502. User1 has three (3) friends (Friend1 504, Friend2 506 and Friend3 508) in his "friends" subdomain 500. Friend1 504 and Friend2 506 are both users in the PPBS system 100. As a result, aliases are used in User1's phone book to point to those users' corresponding PPBS entries or default domains ("user2. ppbs.com" 514 and "user3. ppbs.com" 516). More specifically, Friend1 504 and Friend2 506 correspond to User2 and User3 respectively. The default domains 514 and 516 for User2 and User3 are respectively linked to User2's and User3's records 522 and 524. Friend3 508 is not a PPBS user; therefore, the phone number corresponding to Friend3 508 is entered as a separate record 526 directly into the phone book for User1 without making use of an alias.

In the "coworkers" subdomain 502, User1 has two (2) entries for Coworker1 510 and Coworker2 512 respectively. Coworker2 512 refers to another PPBS user, User4, represented by User4's default domain "user4. ppbs.com" 520 which, in turn, is linked to User4's record 528. Coworker1 510 has an alias linked to User2's default domain "user2. ppbs.com" 518 that is identical to User2's default domain 514 which is linked to Friend1 504 in the "friends" subdomain 500. Hence, both aliases Friend1 504 and Coworker1 510 refer to the same PPBS user, User2, via User2's default domain "user2. ppbs.com". As noted above, User2's default domain "user2. ppbs.com" is linked to User2's record 522. Consequently, in the event that User2 changes his/her phone number (which is effected via a change of User2's record 522), User1's aliases for User2 in both the "friends" and "coworkers" subdomains 500 and 502 are automatically linked to the new phone number (as reflected in User2's record 522) via User2's default domain "user2. ppbs.com", thereby allowing User1 to retrieve User2's new phone number.

The PPBS system 100 also makes use of and extends the concept of "views" in DNS. A view in DNS is generally used to make two different sets of name-to-IP-address mappings viewable to two different groups of people which typically include those inside an organization and those outside the organization. The PPBS system 100 extends views with respect to phone book data to be based on a variety of information. Such information may include, for example, PPBS system state information, network presence of record owner, time of day, information related to the requestor, relationship between requestor and record owner, information provided by record owner, etc. Some of the information may include access conditions or policy that are specified by a record owner. The information is used to determine what view of the phone book data is to be made available to a requestor of a phone book entry. For example, if the network presence information indicates that the record owner is currently out of the office, then the PPBS system 100 may choose to forward the mobile phone number of the record owner to the requestor (assuming the requestor is allowed to received that information).

The PPBS system 100 may provide different views to standard DNS clients 112 and PPBS-enabled clients 114. For example, with respect to a standard DNS client 112, such client 112 might receive different results for a lookup request depending on the time of day that the request is made; alternatively, the results could be based on the IP address or domain name of the requesting client. With respect to a PPBS-enabled client 114, such client 114 may provide additional information that allows the PPBS system 100 to provide views that may be different from those available to standard DNS clients 112. For example, a PPBS-enabled client 114 could identify a requestor as a friend of the owner of the record that is being requested; consequently, a request might return a cell phone number since the requester is a friend. Another requestor may be a co-worker and hence is only allowed to receive a work phone number. Similarly, other information such as access conditions specified by an owner can be used to determine what type of data is to be provided to a requestor.

The PPBS database 108 organized as described above allows information relating to the users to be integrated and linked together. Such integration and linkage allow effective and efficient propagation of changes and enforcement of user policy with respect to data access. For example, without the PPBS system, if a user changes her phone number, she needs to notify all her friends, family and business contacts about the change. Quite often, someone would be left out and hence may lose contact. The PPBS system, on the other hand, enables a user to update his own records and subsequently all his contacts will get the change in substantially real time. The PPBS system also enables the user to define the propagation or access policy so that only people that are intended to get the user's records will be allowed to do so.

Figure 6:
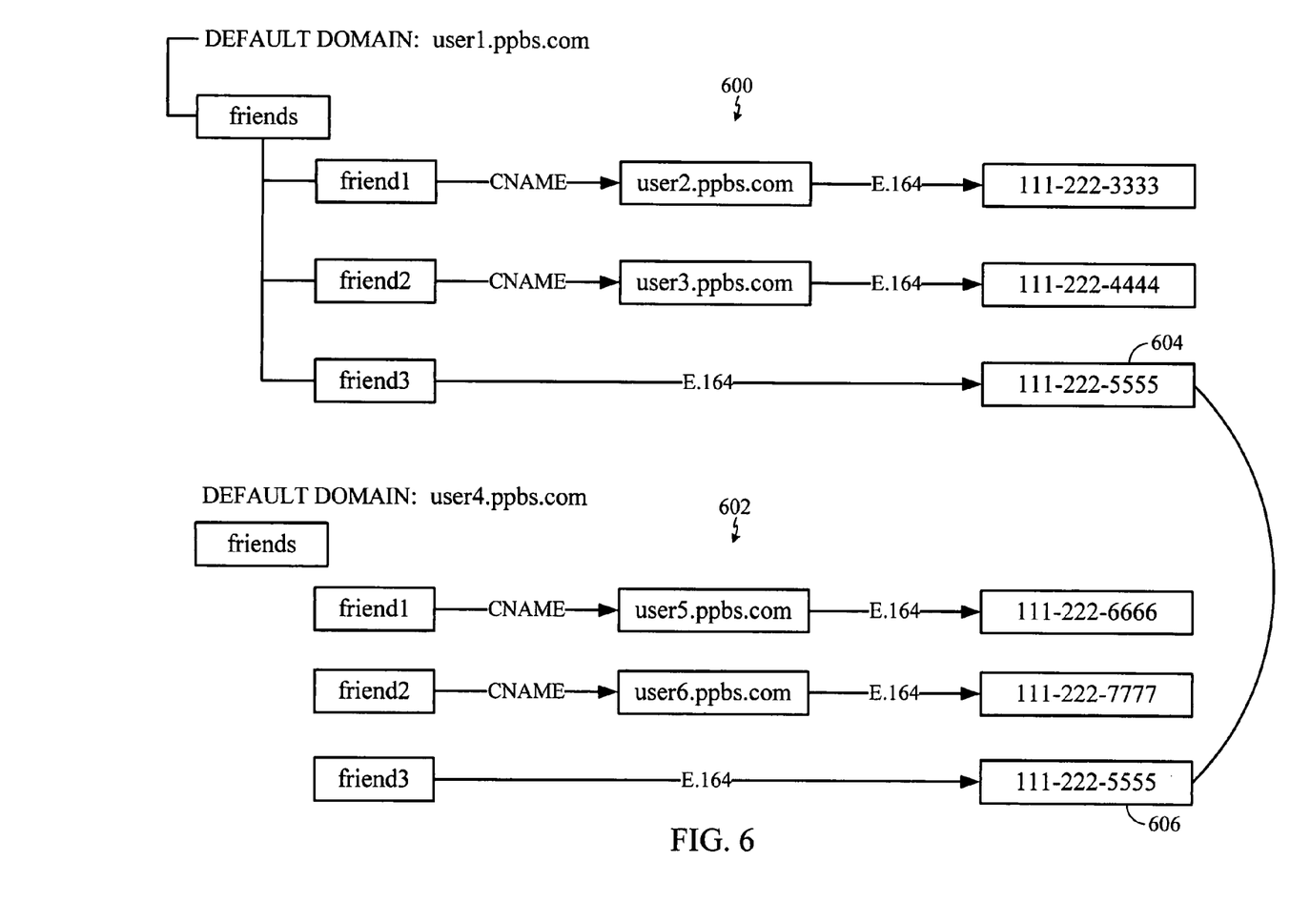
FIG. 6 is a simplified schematic diagram illustrating integration and linkage of information in phone books under the network-based public phone book service.

FIG. 6 illustrates how phone books in the PPBS database 108 can be integrated and linked. As shown in FIG. 6, two registered users, User1 and User4, uploaded their phone books 600 and 602 independently onto the PPBS database 108. As each record from the phone books 600 and 602 is loaded into the PPBS database 108, the authoritative DNS server 104 performs format checking and data verification with records that are already stored in the PPBS database 108. In this example, the phone entry 604 from User1 and the phone book entry 606 from User4 both point to the same user (designated as "Friend3" by both User1 and User4) who has the phone number "111-222-5555". The authoritative DNS server 104 makes note of this connection between User1, User4 and Friend3. If Friend3 is already a registered user of PPBS, Friend3 may already have provided certain propagation and access policy with respect to his records. The propagation and access policy may control which part(s) of his records are accessible to which user. If Friend3 chose to allow other users to point to him and access his records, then the authoritative DNS server 104 will remove the E.164 records from User1 and User4 and point to Friend3 using CNAME records (i.e., using a DNS alias). Next time Friend3 updates his phone number, User1 and User4 will get the updates, assuming Friend3 enables propagation of his modification.

If Friend3 is not currently a registered user of the PPBS, the authoritative DNS server 104 will pick up the shared records of Friend3 between User1 and User4, automatically create one record representing Friend3 and make the phone book entries from User1 and User4 point to that record. Next time either one of User1 and User4 modifies his entry for Friend3, the authoritative DNS server 104 will prompt that user for permission to propagate the change to the entry for other users. Connections or relationships amongst users in the PPBS system 100 may be identified from their records based on uniqueness of certain profile attributes, such as, phone numbers, addresses and names, or a combination of multiple attributes.

By having the ability to identify relationships amongst its users, the PPBS system 100 is able to build complex relationships based on multiple phone books. For example, the DNS subdomain hierarchy can be expanded to generate a list of contacts representing a list of "friends-of-friends". A user of the PPBS may then provide a query containing a parameter indicating the "degree-of-distance" or "degree-of-separation" between that user and another individual. A number of community based user applications may be developed using the integrated and linked data in the PPBS database 108, thereby providing more ways to communicate among groups of users.

The PPBS system 100 may be configured to provide a number of phone book related services including, for example, lookup, update, backup and downloading services, which will be further described below.

Figure 7:
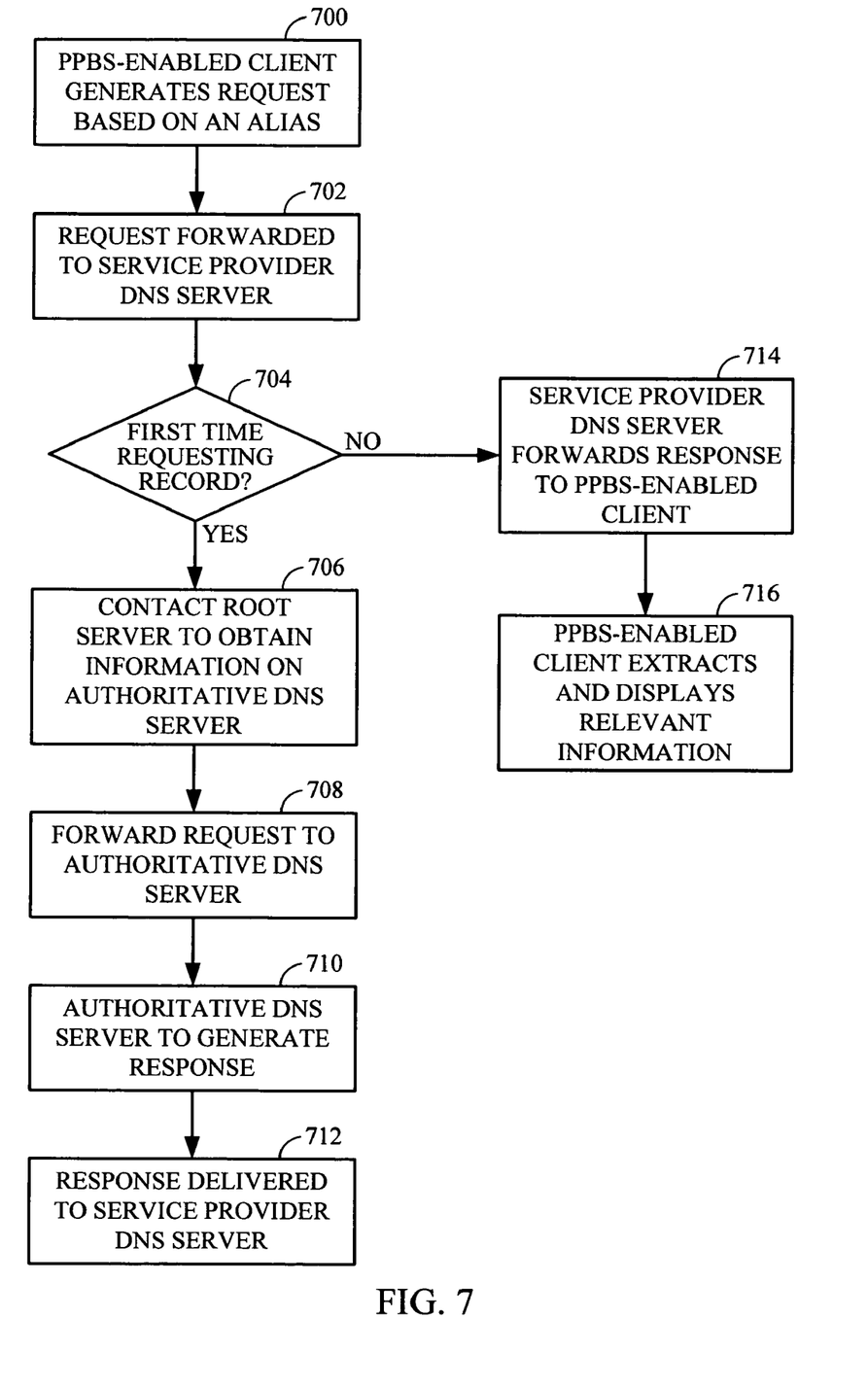
FIG. 7 is a logic flow diagram illustrating operations of the telephone number lookup service.

The PPBS may include a phone book lookup service. FIG. 7 is a logic flow diagram illustrating operations of the lookup service using the system 100. At block 700, a user requests contact information of an existing PPBS user "Fred" using the mobile phone 200 as the PPBS-enabled client 114. The user may use the user interface 206 to activate the PPBS application logic 204 configured to manage the lookup service and provide the name "Fred". Alternatively, the user may select the name "Fred" from a directory list resident on the mobile phone 200. The PPBS-enabled client 114 may then convert the name "Fred" into a proper DNS alias "fred.ppbs.com" and incorporate it as part of a request. Conversion of the name "Fred" into its proper DNS alias depends on the hierarchical structure of the phone book resident on the mobile phone 200 and the conversion process is described above.

At block 702, the request is forwarded by the mobile phone 200 to the service provider DNS server 106.

At block 704, the service provider DNS server 106 determines whether the request is the first time someone wanted to look up this particular record. If so, at block 706, the service provider DNS server 106 contacts the root server 102 which, in turn, identifies the authoritative DNS server 104 responsible for hosting and managing the PPBS domain "ppbs.com".

At block 708, after obtaining information on the authoritative DNS server 104, the service provider DNS server 106 forwards the request to the authoritative DNS server 104 for processing.

At block 710, upon receiving the request from the service provider DNS server 106, the authoritative DNS server 104 examines the request and generates an appropriate response. As described above, the response may be tailored based on a variety of information including, for example, PPBS system state information, network presence of record owner, time of day, information related to the requester, relationship between requestor and record owner and information provided by record owner. It should be noted that, alternatively, the authoritative DNS server 104 may forward the relevant information to the service provider DNS server 106. The service provider DNS server 106 may then tailor the response. In another alternative, the service provider DNS server 106 may in turn forward the relevant information to the PPBS-enabled client 114. The PPBS-enabled client 114 may then tailor the response.

At block 712, the response is forwarded by the authoritative DNS server 104 to the service provider DNS server 106.

At block 714, the service provider DNS server 106, in turn, delivers the response to the PPBS-enabled client 114. The service provider DNS server 106 may further cache the response, thereby providing better performance and improved service availability in case the same record is requested by the same or other clients later. For example, at block 704, if the requested record is available at the service provider DNS server 106, then the service provider DNS server 106 formulates a response incorporating information from the requested record and forwards the response to the PPBS-enabled client 114.

At block 716, upon receiving the response, the PPBS-enabled client 114 extracts the relevant information from the response and display it to the user via the user interface 206. Furthermore, the PPBS-enabled client 114 may also store the relevant information into the phone book 214 resident in the memory 208 for subsequent retrieval.

The PPBS may further include a phone book update service. As noted above, the authoritative DNS server 104 is responsible for hosting and managing the PPBS domain "ppbs.com" and its associated phone book entries for various users. An administrator can modify or update the PPBS database 108 via the administrative interface 110. Similarly, a register user of the PPBS can also update his/her phone book entry and associated information on the PPBS database 108 on an ad hoc basis using the PPBS-enabled client 114. For example, the PPBS application logic 204 may include an application that is configured to send update information with respect to a phone book entry using the standard Dynamic DNS (DDNS) protocol (RFC 2136). All updates are then converted into changes in the PPBS database 108. Subsequently, copies of the updated PPBS database 108 may be generated periodically via a daemon process and propagated to other associated servers, such as the service provider DNS server 106, via a process called DNS zone-transfer. One of the purposes of propagating copies of the updated PPBS database 108 to other associated servers is to balance the workload of the authoritative DNS server 104 so that data can be retrieved more efficiently. The daemon process and the DNS zone-transfer are well known in the art. Zone-transfer is a standard built-in mechanism under the DNS protocols that allows a set of DNS servers to be sync up their databases automatically and efficiently.

Updates made to the PPBS database 108 may also be propagated on an ad hoc basis. Records cached by the service provider DNS server 106 may be tagged with corresponding Time-To-Live (TTL) entries that are set by an administrator of the PPBS domain. If someone issues a request to the service provider DNS server 106 for a record whose TTL indicates that its cached copy has expired, the service provider DNS server 106 would contact the authoritative DNS server 104 to obtain the latest copy of the requested record, thereby allowing changes made to the PPBS database 108 to be propagated in an ad hoc manner when a particular record is requested.

Furthermore, updates to the local phone book 214 associated with the PPBS-enabled client 114 can be initiated by certain triggering events including, for example, time of day, user location, and network presence. For example, upon the PPBS-enabled client 114 contacting the service provider DNS server 106, the service provider DNS server 106 may coordinate with the authoritative DNS server 104 to provide update(s) to the PPBS-enabled client 114 so as to allow its local phone book 214 to be updated.

The PPBS may also include phone book backup and downloading services. Using the PPBS-enabled client 114, a registered user may backup or upload his/her local phone book 214 to the authoritative DNS server 104 during either setup or other user initiated tasks. The registered user may also download his/her entire phone book from the PPBS database 108 in the event that the user needs to resynchronize his/her local phone book 214 resident in the PPBS-enabled client 114. The uploading and downloading of the user's phone book between the PPBS database 108 and the PPBS-enabled client 114 may be facilitated using the DNS zone-transfer process mentioned above. The standard DNS zone-transfer only enables the transfer of information in one direction from a "master" server to a "slave" server. However, the DNS zone-transfer may be modified to accommodate a two-way transfer. For downloading purposes, the PPBS-enabled client 114 can request from the authoritative DNS server 104 (via the service provider DNS server 106) a "zone" representing the latest copy of phone book entries for its local phone book 214. For uploading purposes, the PPBS-enabled client 114 can also send to the authoritative DNS server 104 a new zone representing a copy of the local phone book 214 and request the authoritative DNS server 104 to replace the corresponding phone book in the PPBS database 108 with the new zone.

As described, a machine readable device, such as memory 208 and/or 806, can be configured to store a plurality of directory entries organized in a subdomain hierarchical structure. Each directory entry is associated with an alias constructed using subdomain hierarchical information and each alias is linked to a user domain associated with a user. The user domain is linked to a record containing contact information for the user. By organizing, configuring and/or managing a directory as described, a more effective, convenient and/or used-friendly network-based public telephone directory service is provided.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the embodiments disclosed herein may be embodied directly in hardware, in a software module executable by a processor, or in a combination of both, in the form of control logic, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit of scope of the invention. Thus, the present invention is not intended to be limited to the embodiments shown herein, but is to be accorded the full scope consistent with the claims, wherein reference to an element in the singular is not intended to mean "one and only one" unless specifically so stated, but rather "one or more". All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for".

What is claimed is:

1. A computing device, comprising:
    a device processor;
    communication circuitry coupled to the device processor and configured to communicate with a public phone book service (PPBS) server storing a network directory comprising a plurality of default user domains organized in a first subdomain hierarchical structure, each default user domain being associated with a record containing contact information associated with a user, and each default user domain being constructed into a domain-based name based on the first subdomain hierarchical structure; and
    a device memory coupled to the device processor, the device memory storing a local directory comprising a plurality of directory entries organized in a second subdomain hierarchical structure, each directory entry being constructed into a domain-based name based on the second subdomain hierarchical structure, at least one directory entry being associated with one of a plurality of aliases, and each of the plurality of aliases being linked to at least one of the plurality of default user domains of the network directory stored in PPBS server,
    wherein the device processor is configured with processor-executable instructions to perform operations comprising:
        receiving a request for contact information associated with the least one directory entry;
        accessing the local directory to determine whether the directory entry for which contract information is requested is associated with an alias;
        retrieving contact information associated with the directory entry from the local directory in response to determining that the directory entry for which contract information is requested is not associated with an alias;
        retrieving the alias associated with the directory entry from the local directory in response to determining that the directory entry for which contract information is requested is associated with an alias;
        resolving the retrieved alias to at least one of the default user domains of the network directory stored in the PPBS server;
        sending a lookup request including the resolved alias to the PPBS server; and
        receiving a record containing contact information associated with the directory entry from the PPBS server.

2. The computing device of claim 1, wherein the device processor is configured with processor-executable instructions to perform operations such that receiving a record containing contact information associated with the directory entry from the PPBS server comprises receiving a record containing a telephone number from the PPBS server.

3. The computing device of claim 1, wherein the device processor is configured with processor-executable instructions to perform operations such that:
    resolving the retrieved alias to at least one of the default user domains of the network directory stored in the PPBS server comprises resolving the second subdomain hierarchical structure associated with the retrieved alias to the first subdomain hierarchical structure; and
    sending a lookup request including the resolved alias to the PPBS server comprises sending a lookup request including the retrieved alias to the PPBS server based on the resolved first subdomain hierarchical structure.

4. The computing device of claim 1, wherein the device processor is configured with processor-executable instructions to perform operations such that resolving the retrieved alias to at least one of the default user domains of the network directory stored in the PPBS server comprises resolving the retrieved alias to a default user domain organized in the first subdomain hierarchical structure based on Domain Name System (DNS) protocols.

5. The computing device of claim 1, wherein the device processor is configured with processor-executable instructions to perform operations such that:
    sending a lookup request including the resolved alias to the PPBS server comprises sending a request including additional information associated with a specified user; and
    receiving a record containing contact information associated with the directory entry from the PPBS server comprises receiving a tailored response based on the additional information included in the lookup request.

6. The computing device of claim 5, wherein the device processor is configured with processor-executable instructions to perform operations such that:
    sending a request including additional information associated with a specified user comprises sending a request that includes an access policy of the specified user.

7. The computing device of claim 5, wherein the device processor is configured with processor-executable instructions to perform operations such that sending a request including additional information associated with a specified user comprises sending a request that includes at least one of user information and device information.

8. The computing device of claim 1, wherein the device processor is configured with processor-executable instructions to perform operations further comprising:
    synchronizing the local directory with the network directory.

9. The computing device of claim 1, wherein the device processor is configured with processor-executable instructions to perform operations further comprising:
    identifying a relationship between two or more directory entries.

10. The computing device of claim 9, wherein the device processor is configured with processor-executable to perform operations such that identifying a relationship between two or more directory entries comprises identifying a degree-of-separation between the two or more directory entries.

11. A non-transitory computer readable storage medium having stored thereon processor-executable software instructions configured to cause a mobile device processor to perform operations for retrieving information from a public phone book service (PPBS) server storing a network directory comprising a plurality of default user domains organized in a first subdomain hierarchical structure, each default user domain being associated with a record containing contact information associated with a user and each default user domain being constructed into a domain-based name based on the first subdomain hierarchical structure, the operations comprising:

storing a local directory comprising a plurality of directory entries organized in a second subdomain hierarchical structure, each directory entry being constructed into a domain-based name based on the second subdomain hierarchical structure, at least one directory entry being associated with one of a plurality of aliases, and each of the plurality of aliases being linked to at least one of the plurality of default user domains in the network directory stored in the PPBS server,     receiving a request for contact information associated with the least one directory entry;

accessing the local directory to determine whether the directory entry for which contract information is requested is associated with an alias;

retrieving contact information associated with the directory entry from the local directory in response to determining that the directory entry for which contract information is requested is not associated with an alias;

retrieving the alias associated with the directory entry from the local directory in response to determining that the directory entry for which contract information is requested is associated with an alias;

resolving the retrieved alias to at least one of the default user domains of the network directory stored in the PPBS server;

sending a lookup request including the resolved alias to the PPBS server; and     receiving a record containing contact information associated with the directory entry from the PPBS server.

12. The non-transitory computer readable storage medium of claim 11, wherein the stored processor-executable software instructions are configured to cause a mobile device processor to perform operations such that receiving a record containing contact information associated with the directory entry from the PPBS server comprises receiving a record containing a telephone number from the PPBS server.

13. The non-transitory computer readable storage medium of claim 11, wherein the stored processor-executable software instructions are configured to cause a mobile device processor to perform operations such that:

resolving the retrieved alias to at least one of the default user domains of the network directory stored in the PPBS server comprises resolving the second subdomain hierarchical structure associated with the retrieved alias to the first subdomain hierarchical structure; and     sending a lookup request including the resolved alias to the PPBS server comprises sending a lookup request including the retrieved alias to the PPBS server based on the resolved first subdomain hierarchical structure.

14. The non-transitory computer readable storage medium of claim 11, wherein the stored processor-executable software instructions are configured to cause a mobile device processor to perform operations such that resolving the retrieved alias to at least one of the default user domains of the network directory stored in the PPBS server comprises resolving the retrieved alias to a default user domain organized in the first subdomain hierarchical structure based on Domain Name System (DNS) protocols.

15. The non-transitory computer readable storage medium of claim 11, wherein the stored processor-executable software instructions are configured to cause a mobile device processor to perform operations such that:

sending a lookup request including the resolved alias to the PPBS server comprises sending a request including additional information associated with a specified user.

16. The non-transitory computer readable storage medium of claim 15, wherein the stored processor-executable software instructions are configured to cause a mobile device processor to perform operations such that:

sending a request including additional information associated with a specified user comprises sending a request that includes an access policy of the specified user.

17. The non-transitory computer readable storage medium of claim 15, wherein the stored processor-executable software instructions are configured to cause a mobile device processor to perform operations such that sending a request including additional information associated with a specified user comprises sending a request that includes at least one of user information and device information.

18. The non-transitory computer readable storage medium of claim 11, wherein the stored processor-executable software instructions are configured to cause a mobile device processor to perform operations further comprising:

synchronizing the local directory with the network directory.

19. The non-transitory computer readable storage medium of claim 11, wherein the stored processor-executable software instructions are configured to cause a mobile device processor to perform operations further comprising:

identifying a relationship between two or more directory entries.

20. The non-transitory computer readable storage medium of claim 19, wherein the stored processor-executable software instructions are configured to cause a mobile device processor to perform operations such that that identifying a relationship between two or more directory entries comprises identifying a degree-of-separation between the two or more directory entries.

21. A computing device, comprising:

means for communicating with a public phone book service (PPBS) server storing a network directory comprising a plurality of default user domains organized in a first subdomain hierarchical structure, each default user domain being associated with a record containing contact information associated with a user and each default user domain being constructed into a domain-based name based on the first subdomain hierarchical structure;

means for storing a local directory comprising a plurality of directory entries organized in a second subdomain hierarchical structure, each directory entry being constructed into a domain-based name based on the second subdomain hierarchical structure, at least one directory entry being associated with one of a plurality of aliases, and each of the plurality of aliases being linked to at least one of the plurality of default user domains in the network directory stored in the PPBS server;

means for receiving a request for contact information associated with the least one directory entry;

means for accessing the local directory to determine whether the directory entry for which contract information is requested is associated with an alias;

means for retrieving contact information associated with the directory entry from the local directory in response to determining that the directory entry for which contract information is requested is not associated with an alias;

means for retrieving the alias associated with the directory entry from the local directory in response to determining that the directory entry for which contract information is requested is associated with an alias;

means for resolving the retrieved alias to at least one of the default user domains of the network directory stored in the PPBS server of the PPBS server;

means for sending a lookup request including the resolved alias to the PPBS server; and means for receiving a record containing contact information associated with the directory entry from the PPBS server.

22. The computing device of claim 21, wherein means for receiving a record containing contact information associated with the directory entry from the PPBS server comprises means for receiving a record containing a telephone number.

23. The computing device of claim 21, wherein:

means for resolving the retrieved alias to at least one of the default user domains of the network directory stored in the PPBS server comprises means for resolving the second subdomain hierarchical structure associated with the retrieved alias to the first subdomain hierarchical structure; and means for sending a lookup request including the resolved alias to the PPBS server comprises means for sending a lookup request including the retrieved alias to the PPBS server based on the resolved first subdomain hierarchical structure.

24. The computing device of claim 21, wherein means for resolving the retrieved alias to at least one of the default user domains of the network directory stored in the PPBS server comprises means for resolving the retrieved alias to a default user domain organized in the first subdomain hierarchical structure based on Domain Name System (DNS) protocols.

25. The computing device of claim 21, wherein:

means for sending a lookup request including the resolved alias to the PPBS server comprises means for sending a request including additional information associated with a specified user.

26. The computing device of claim 25, wherein:

means for sending a request including additional information associated with a specified user comprises means for sending a request that includes an access policy of the specified user.

27. The computing device of claim 25, wherein means for sending a request including additional information associated with a specified user comprises means for sending a request that includes at least one of user information and device information.

28. The computing device of claim 21, further comprising: means for synchronizing the local directory with the network directory.

29. The computing device of claim 21, further comprising: means for identifying a relationship between two or more directory entries.

30. The computing device of claim 29, means for identifying a relationship between two or more directory entries comprises means for identifying a degree-of-separation between the two or more directory entries.

31. A method of accessing a public phone book service (PPBS) server storing a network directory comprising a plurality of default user domains organized in a first subdomain hierarchical structure, each default user domain being associated with a record containing contact information associated with a user and each default user domain being constructed into a domain-based name based on the first subdomain hierarchical structure, the method comprising:

receiving a request for contact information associated with a directory entry;

accessing a local directory comprising a plurality of directory entries organized in a second subdomain hierarchical structure, each directory entry being constructed into a domain-based name based on the second subdomain hierarchical structure, at least one directory entry being associated with one of a plurality of aliases, and each of the plurality of aliases being linked to at least one of the plurality of default user domains in the network directory stored in the PPBS server, retrieving contact information associated with the directory entry from the local directory in response to determining that the directory entry for which contract information is requested is not associated with an alias;

retrieving the alias associated with the directory entry from the local directory in response to determining that the directory entry for which contract information is requested is associated with an alias;

resolving the retrieved alias to at least one of the default user domains of the network directory stored in the PPBS server;

sending a lookup request including the resolved alias to the PPBS server; and receiving a record containing contact information associated with the directory entry from the PPBS server.

32. The method of claim 31, wherein receiving a record containing contact information associated with the directory entry from the PPBS server comprises receiving a record containing a telephone number.

33. The method of claim 31, wherein:

resolving the retrieved alias to at least one of the default user domains of the network directory stored in the PPBS server comprises resolving the second subdomain hierarchical structure associated with the retrieved alias to the first subdomain hierarchical structure; and sending a lookup request including the resolved alias to the PPBS server comprises sending a lookup request including the retrieved alias to the PPBS server based on the resolved first subdomain hierarchical structure.

34. The method of claim 31, wherein resolving the retrieved alias to at least one of the default user domains of the network directory stored in the PPBS server comprises resolving the retrieved alias to a default user domain organized in the first subdomain hierarchical structure based on Domain Name System (DNS) protocols.

35. The method of claim 31, wherein:

sending a lookup request including the resolved alias to the PPBS server comprises sending a request including additional information associated with a specified user.

36. The method claim 35, wherein:

sending a request including additional information associated with a specified user comprises sending a request that includes an access policy of the specified user.

37. The method of claim 35, wherein sending a request including additional information associated with a specified user comprises sending a request that includes at least one of user information and device information.

38. The method of claim 31, further comprising:

synchronizing the local directory with the network directory.

39. The method of claim 31, further comprising:

identifying a relationship between two or more directory entries.

40. The method of claim 39, identifying a relationship between two or more directory entries comprises identifying a degree-of-separation between the two or more directory entries.

41. A system, comprising:
a public phone book service (PPBS) server comprising a server memory and a server processor coupled to the server memory, the server memory storing a network directory comprising a plurality of default user domains organized in a first subdomain hierarchical structure, each default user domain being associated with a record containing contact information for a user,
a mobile device comprising a device memory and a device processor coupled to the device memory, the device memory storing a local directory comprising a plurality of directory entries organized in a second subdomain hierarchical structure, wherein at least one directory entry is associated with an alias and each alias is linked to one of the plurality of default user domains of the network directory stored in the server memory;
wherein the device processor is configured with processor-executable instructions to perform operations comprising:
receiving a request for contact information associated with the least one directory entry;
accessing the local directory to determine whether the directory entry for which contract information is requested is associated with an alias;
retrieving contact information associated with the directory entry from the local directory in response to determining that the directory entry for which contract information is requested is not associated with an alias;
retrieving the alias associated with the directory entry from the local directory in response to determining that the directory entry for which contract information is requested is associated with an alias;
resolving the retrieved alias to at least one of the default user domains of the network directory stored in the server memory;
sending a lookup request including the resolved alias to the PPBS server; and
receiving a record containing contact information associated with the directory entry from the PPBS server.

42. The system of claim 41, wherein the device processor is configured with processor-executable instructions such that receiving a record containing contact information associated with the directory entry from the PPBS server comprises receiving a record containing a telephone number from the PPBS server.

43. The system of claim 41, wherein the device processor is configured with processor-executable instructions to perform operations such that:
resolving the retrieved alias to at least one of the default user domains of the network directory stored in the server memory comprises resolving the second subdomain hierarchical structure associated with the retrieved alias to the first subdomain hierarchical structure; and
sending a lookup request including the resolved alias to the PPBS server comprises sending a lookup request including the retrieved alias to the PPBS server based on the resolved first subdomain hierarchical structure.

44. The system of claim 41, wherein the device processor is configured with processor-executable instructions to perform operations such that resolving the retrieved alias to at least one of the default user domains of the network directory stored in the server memory comprises resolving the retrieved alias to a default user domain organized in the first subdomain hierarchical structure based on Domain Name System (DNS) protocols.

45. The system of claim 41, wherein the device processor is configured with processor-executable instructions to perform operations such that:
sending a lookup request including the resolved alias to the PPBS server comprises sending a request including additional information associated with a specified user; and
receiving a record containing contact information associated with the directory entry from the PPBS server comprises receiving a tailored response based on the additional information included in the lookup request.

46. The system of claim 45, wherein:
the device processor is configured with processor-executable instructions to perform operations such that sending a request including additional information associated with a specified user comprises sending a request that includes an access policy of the specified user; and
the server processor is configured with processor-executable instructions to perform operations comprising sending a tailored response to the mobile device based on the access policy included in the request.

47. The system of claim 45, wherein the device processor is configured with processor-executable instructions to perform operations such that sending a request including additional information associated with a specified user comprises sending a request that includes at least one of user information and device information.

48. The system of claim 41, wherein the device processor is configured with processor-executable instructions to perform operations further comprising:
synchronizing the local directory with the network directory.

49. The system of claim 41, wherein the device processor is configured with processor-executable instructions to perform operations further comprising:
identifying a relationship between two or more directory entries.

50. The system of claim 49, wherein the device processor is configured with processor-executable instructions to perform operations such that identifying a relationship between two or more directory entries comprises identifying a degree-of-separation between the two or more directory entries.

* * * * *